(12) United States Patent
Schroll et al.

(10) Patent No.: US 12,342,770 B1
(45) Date of Patent: Jul. 1, 2025

(54) MODULAR TREATMENT DEVICE

(71) Applicant: Oishii Farm Corporation, Jersey City, NJ (US)

(72) Inventors: Gregory Schroll, Denver, CO (US); Timothy Brackbill, Lakewood, CO (US); Eric Adamson, Denver, CO (US); Vincent Louie Chiu, Broomfield, CO (US); Matthew Thomas White, Denver, CO (US)

(73) Assignee: Oishii Farm Corporation, Jersey City, NJ (US)

( * ) Notice: Subject to any disclaimer, the term of this patent is extended or adjusted under 35 U.S.C. 154(b) by 0 days.

(21) Appl. No.: 18/759,481

(22) Filed: Jun. 28, 2024

(51) Int. Cl.
*A01G 7/04* (2006.01)
*A01B 63/00* (2006.01)

(52) U.S. Cl.
CPC ............ *A01G 7/045* (2013.01); *A01B 63/002* (2013.01); *A01B 63/008* (2013.01)

(58) Field of Classification Search
CPC . A01G 7/045; A01G 7/04; A01G 9/20; A01G 9/26; A01B 63/002; A01B 63/008; A01B 63/004; A01B 63/02
See application file for complete search history.

(56) References Cited

U.S. PATENT DOCUMENTS

| | | | |
|---|---|---|---|
| 8,985,817 B1 * | 3/2015 | Schalch, III | F21V 15/02 362/147 |
| 12,041,893 B1 * | 7/2024 | Genga, Jr. | F21V 21/15 |
| 2009/0272029 A1 | 11/2009 | Aiking | |
| 2016/0198640 A1 * | 7/2016 | Singh | A01G 7/045 362/96 |
| 2020/0060105 A1 * | 2/2020 | Tsivikis | H05B 45/10 |
| 2023/0034181 A1 * | 2/2023 | DuFresne | F21V 21/15 |

FOREIGN PATENT DOCUMENTS

FR 3124049 A1 * 12/2022 ............. A01G 7/045

OTHER PUBLICATIONS

Author Unknown, Automating Pest and Disease Control with Light, TRIC Robotics, 2024, https://www.tricrobotics.com/.
Author Unknown, Lumion for Strawberries, Octiva.tech, 2024, https://octiva.tech/products/lumion-strawberries/.
Author Unknown, Np Seymour Bio Applicator, 2024, NP Seymour, https://npseymour.co.uk/products/bio-applicator/?cn-reloaded=1.
Author Unknown, Thorvald Platform, Saga Robotics, 2024, https://sagarobotics.com/thorvald-platform/.
Author Unknown, Probabilistic Models in Machine Learning, GeeksforGeeks, May 29, 2023, https://www.geeksforgeeks.org/probabilistic-models-in-machine-learning/.

* cited by examiner

*Primary Examiner* — Trinh T Nguyen

(74) *Attorney, Agent, or Firm* — Amster, Rothstein & Ebenstein LLP

(57) ABSTRACT

An agricultural robot includes a modular treatment device situated on top of a base. The modular treatment device includes a boom system having a first arm and a second arm. A plurality of light modules are located on the first arm and the second arm.

28 Claims, 14 Drawing Sheets

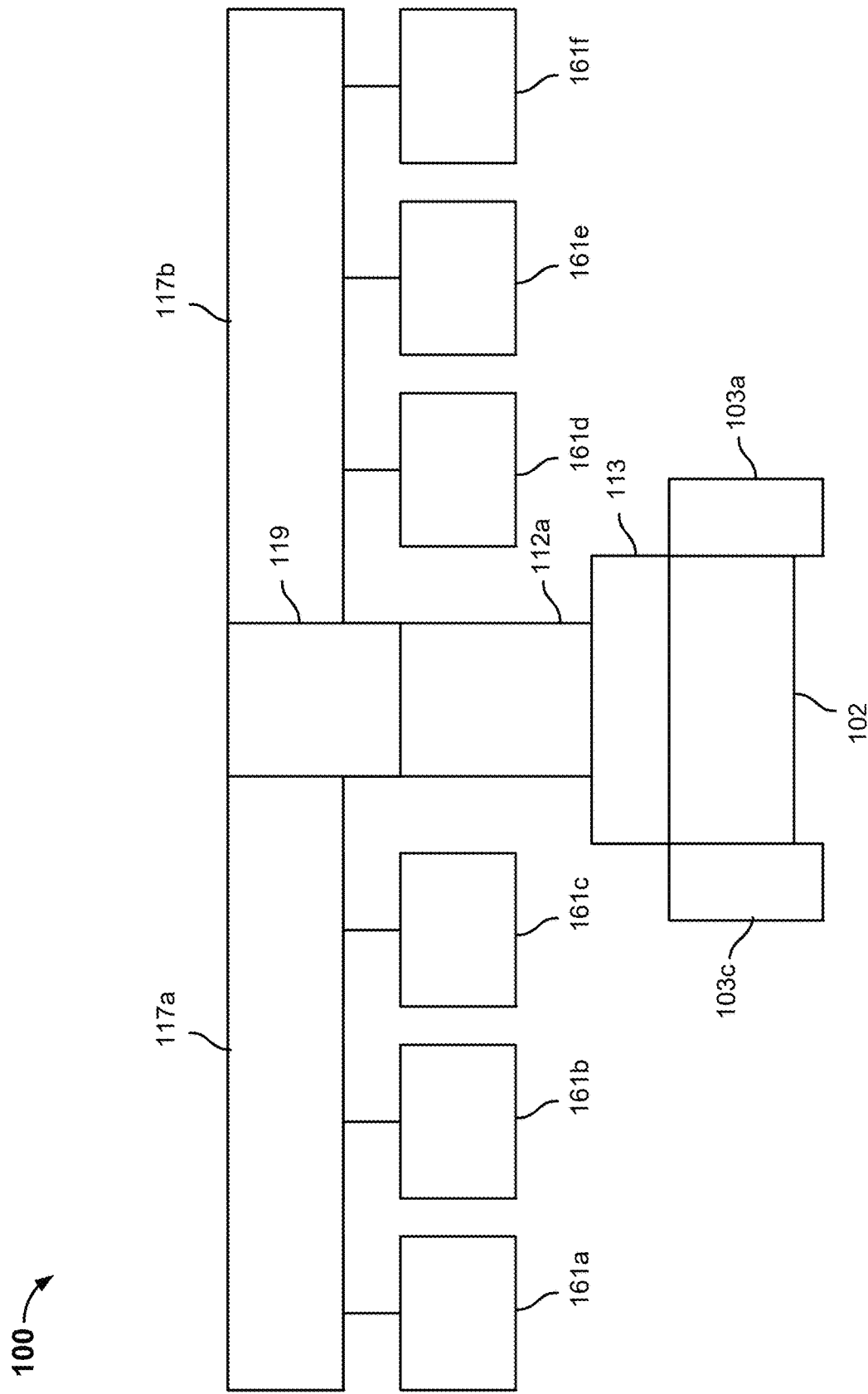

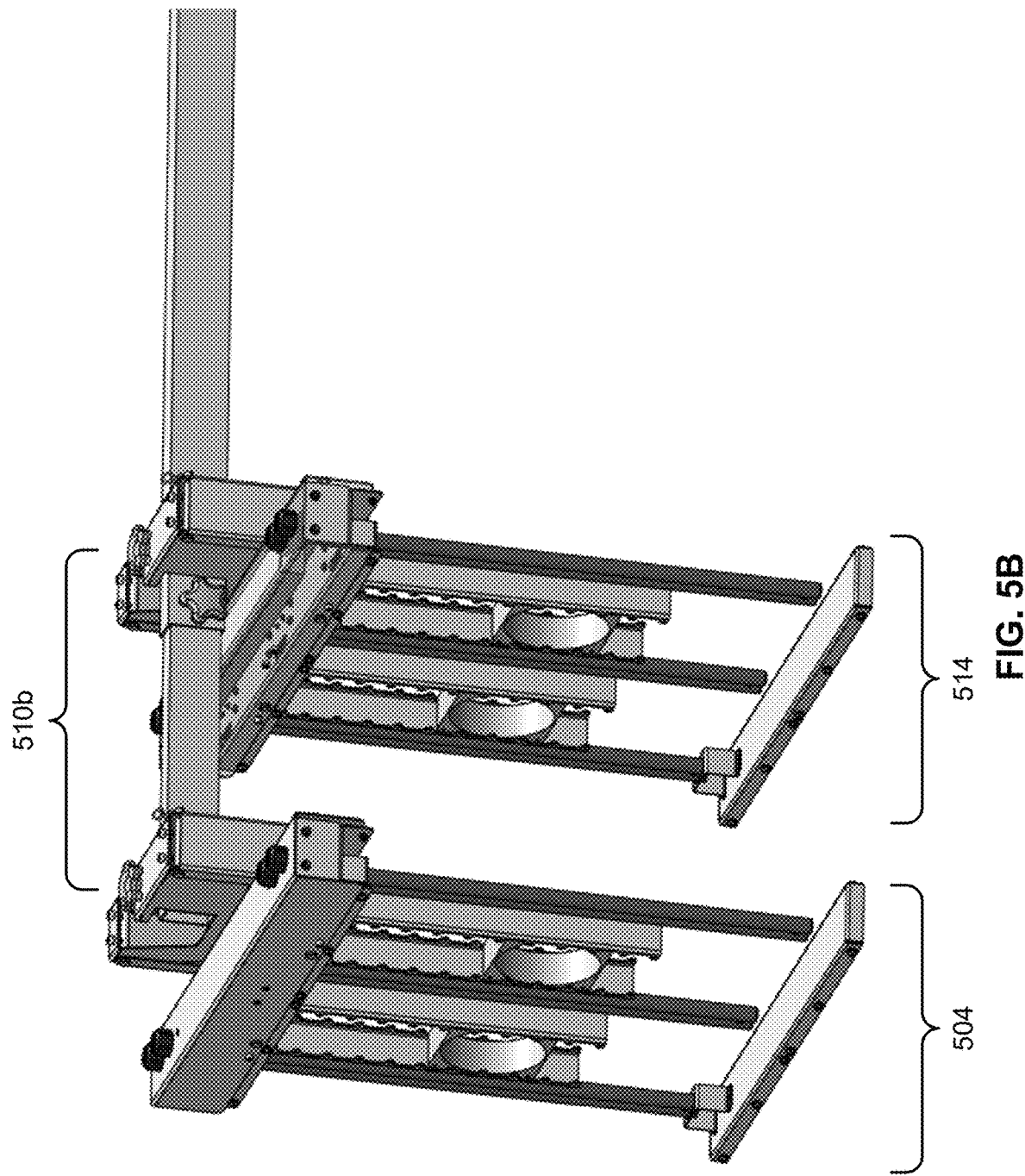

MODULAR TREATMENT DEVICE

BACKGROUND OF THE INVENTION

Alley cropping is the planting of rows of plants (e.g., trees, shrubs, vines, etc.) to create alleys within which agricultural crops are produced. The plants may be subject to disease from fungus, mildew, and/or insects. This reduces the throughput of a crop since some of the harvest may not be used or sold. Other systems may go through each row and spray the plants with pesticides to prevent the plants from being subject to disease. However, this may take a long time to perform since a grow environment may include many rows of plants. Furthermore, pesticides are bad for one's health and the environment. Lastly, the use of pesticides places constraints on farm operations because they often require a waiting period until the plants can be picked after the pesticides have been applied.

BRIEF DESCRIPTION OF THE DRAWINGS

Various embodiments of the invention are disclosed in the following detailed description and the accompanying drawings.

FIG. 1D is a block diagram illustrating a system to treat plants for disease in accordance with some embodiments.

FIGS. 5A, 5B, and 5C are diagrams illustrating an arm having two modules in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
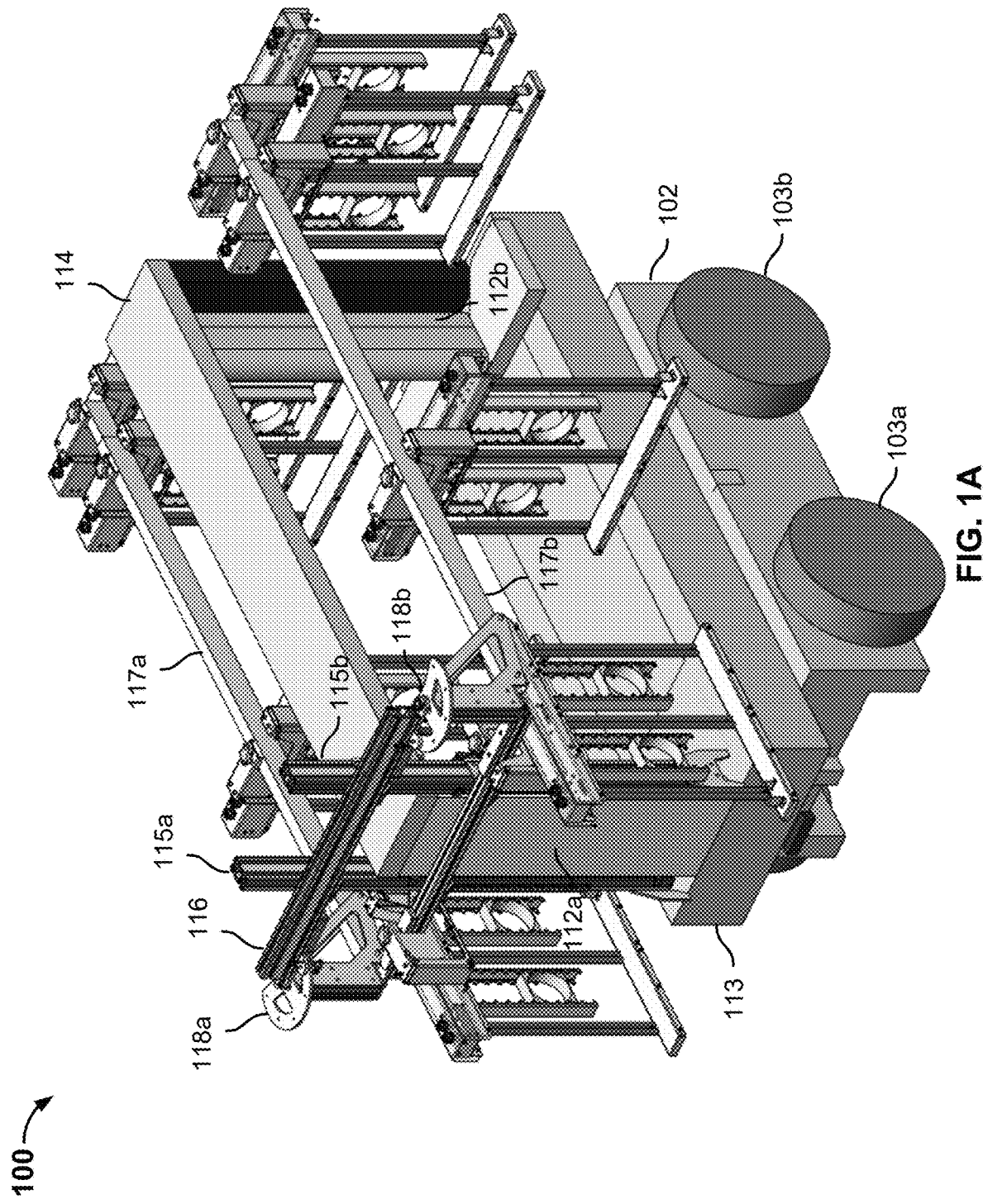
FIG. 1A is a diagram illustrating a system to treat plants for disease in accordance with some embodiments.

Systems and methods to prevent or reduce the likelihood of plants being subject to disease are disclosed herein. An agricultural robot includes a robotic system and a modular treatment device. The modular treatment device may be mounted on a robotic system that includes a base having a plurality of wheels or tracks that enable the robotic system to travel (autonomously or by remote control) through a grow environment. In some embodiments, as seen in FIG. 1C, the modular treatment device is mounted on a tow platform that is towed by a tractor or other piece of farm equipment. The robotic system includes a base on which a gantry structure is situated. The modular treatment device includes a boom system where a bracket is coupled to the gantry structure via a first vertical rail and a second vertical rail. The bracket may be vertically translated to a plurality of different heights by the first vertical rail and the second vertical rail. A first arm is coupled to a first side of the adjustable bracket at a first pivot point. A second arm is coupled to a second side of the vertically adjustable bracket at a second pivot point. The first arm and the second arm include one or more corresponding modules (e.g., Ultraviolet-C(UVC) light modules or other type of light module, camera module, sprayer module). The distance between the modules can be configurable based on the size of the plants in a row. The distance between the modules can be configurable based on a distance between rows in a grow environment. The number of modules on an arm is adjustable based on a number of rows in a farm. The location of modules on an arm are configured in a manner to eliminate or reduce the likelihood that a module will come into contact with an object as the robotic system is traveling through the grow environment.

The first arm and the second arm may have at least two adjustable positions. In a first position, for example as seen in FIG. 1A, the first arm and the second arm are parallel with a length side of the base. When traveling in a row, the first rotatable arm and the second rotatable arm and their corresponding modules are configured to stay within a single row. In some embodiments, in the first position, some or all of the plurality of lights of the modules are perpendicular to the length side of the base.

Figure 1B:
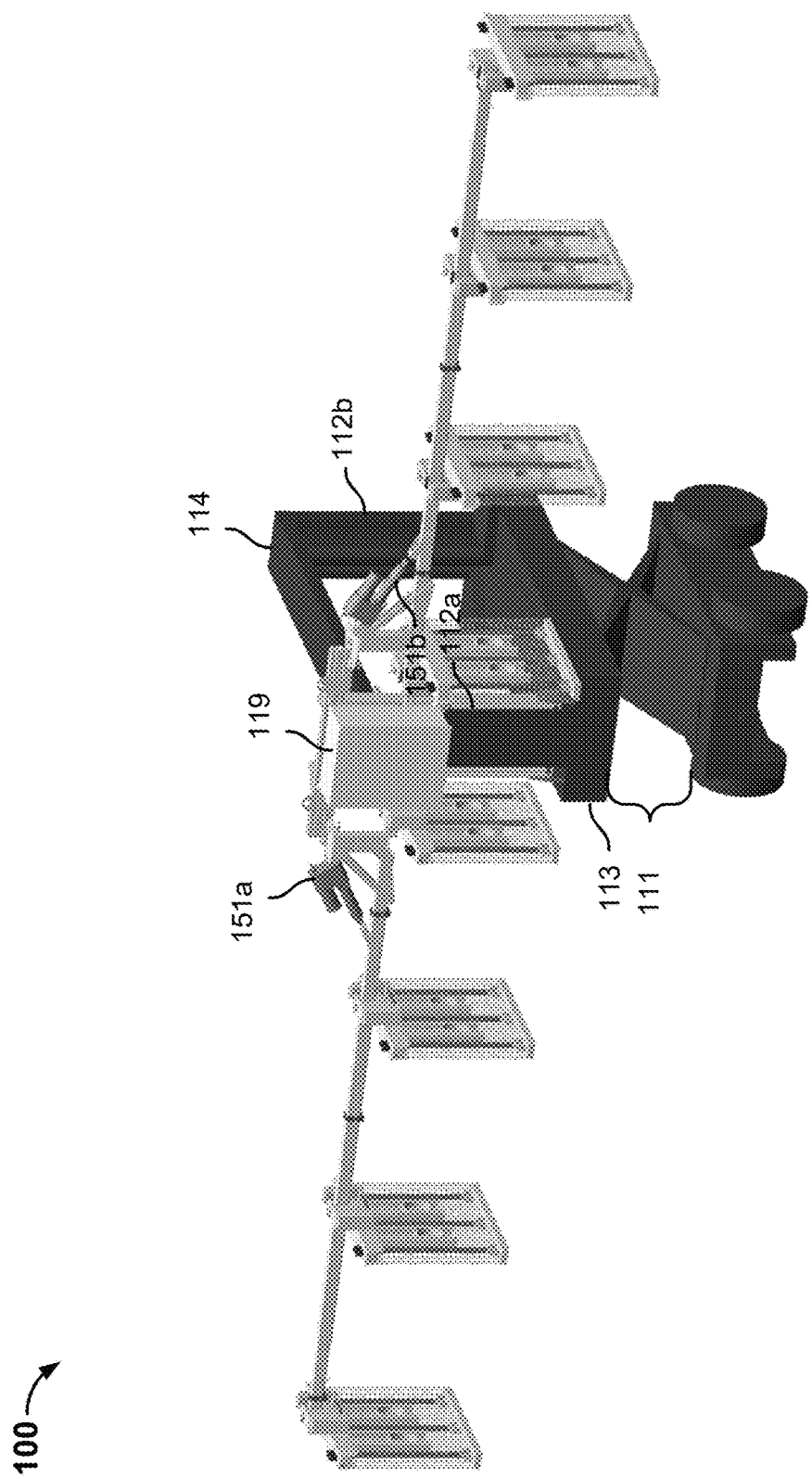
FIG. 1B is a diagram illustrating a system to treat plants for disease in accordance with some embodiments.
Figure 1C:
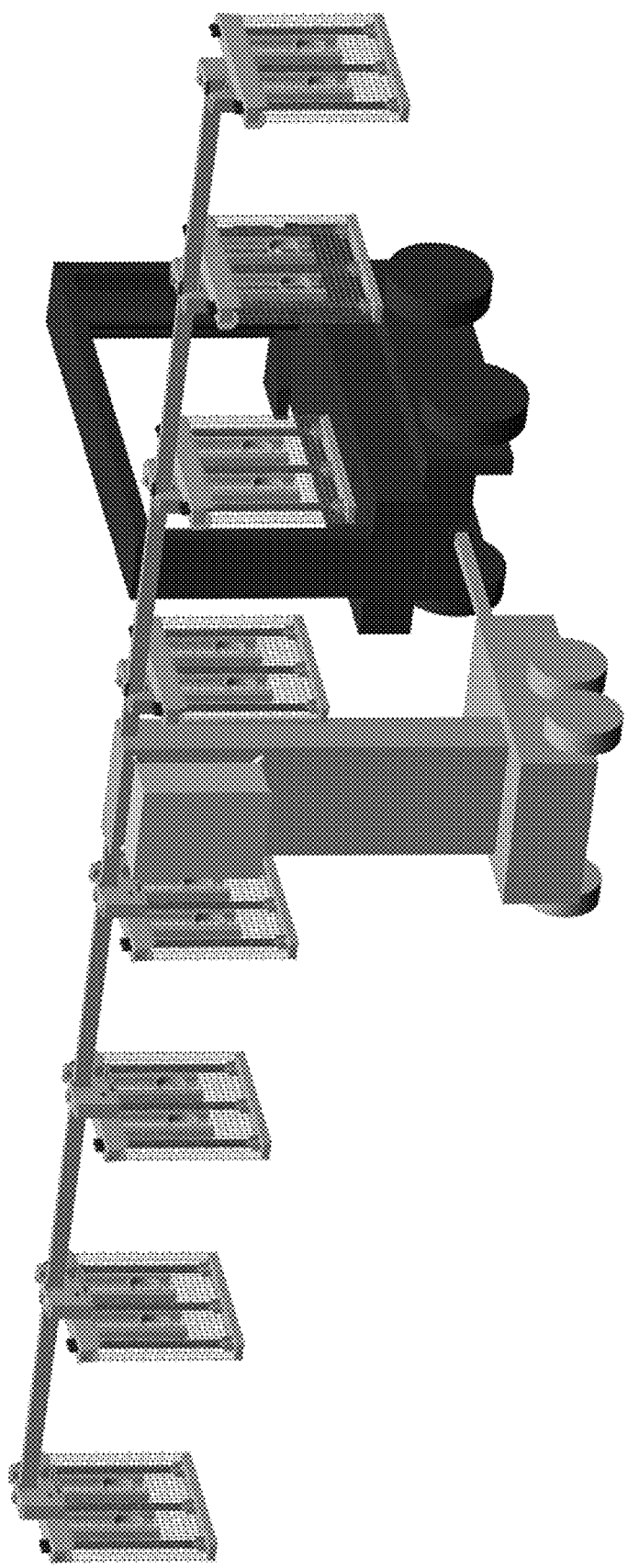
FIG. 1C is a diagram illustrating a system to treat plants for disease in accordance with some embodiments.

In a second position, for example, as seen in FIG. 1B, the first arm and the second arm are perpendicular to the length side of the base. This enables the agricultural robot to concurrently treat plants in a plurality of rows for disease. Instead of subjecting plants to UVC light in a row-by-row fashion, the modular treatment device disclosed herein, is able to subject plants in multiple rows of plants to UVC light at the same time. As a result, the amount of time to treat plants for disease is reduced. In the second position, the plurality of modules are parallel with a length side of the base. The first arm and the second arm may be adjustable to one or more positions that are in between the first position and the second position.

Because the growth of plants is not uniform, a plant or other hard object may come into contact with a module as the modular treatment device is moving through a grow environment. To prevent the modular treatment device from damaging the plant or other object and to prevent the plant or other hard object from damaging the modular treatment device, the modular treatment device is equipped with one or more sensors configured to detect contact between the modular treatment device and one or more objects, such as one or more plants in a grow environment. In some embodiments, the first arm and the second arm are equipped with a corresponding sensor. In some embodiments, the first arm and the second arm are equipped with a corresponding plurality of sensors. A sensor may be positioned where a module is positioned on an arm. A sensor may be positioned at an offset from where a module is positioned on an arm. In some embodiments, each module is associated with a corresponding sensor. A sensor may be a hall effect sensor, a force sensor, a light sensor, a proximity sensor, a capacitive sensor, or any other type of sensor that outputs a value indicative of contact between an object and the modular treatment device.

The modular treatment device may include a processor coupled to the one or more sensors. In response to receiving from the one or more sensors a value indicative of contact between a plant and the modular treatment device, the processor is configured to turn off or reduce the intensity of light output by the plurality of modules. This limits or may prevent damage to plants near the modules. A plant may become damaged if exposed to excessive amounts of UVC light for an extended period of time. The processor is also configured to provide a control signal to a motor controller associated with the modular treatment device. The control signal causes the motor controller to stop a motor associated with the robotic system. In some embodiments, the control signal causes a braking force to be applied to one or more wheels associated with the robotic system. The control signal may prevent the plant from further damaging one or more modules and the modular treatment device from physically damaging plants (e.g., fruit hanging from a vine) in the grow environment.

FIGS. 1A and 1B are diagrams illustrating a system to treat plants for disease in accordance with some embodiments. In the example shown, system 100 includes a robotic system and a modular treatment device. The robotic system includes a base 102 having a plurality of wheels, such as wheels 103a, 103b, a motor (not shown), and a motor controller (not shown). The robotic system further includes a gantry structure having a base 113 and an overhead structure 114 that is mounted on base 113 via a first vertical support 112a and a second vertical support 112b. The robotic system includes a lifting mechanism 111 that may be in a closed position (as seen in FIG. 1A), a fully open position (as seen in FIG. 1B), or one or more positions in between the closed position and the fully open position. The lifting mechanism 111 includes a motor controller (not shown). A remote control signal from a remote controller may be provided to the motor controller to control a position of the lifting mechanism 111.

The modular treatment device includes a first vertical rail 115a located on a first side of the first vertical support 112a and a second vertical rail 115b located on a second side of the first vertical support 112a. In some embodiments, the first vertical rail 115a is located on a first side of the second vertical support 112b and the second vertical rail 115 is located on a second side of the second vertical support 112b. In some embodiments, the first vertical rail 115a is located on a first side of the overhead structure 114 and the second vertical rail 115b is located on a second side of the overhead structure 114. Bracket 116 is coupled to the first vertical rail 115a and the second vertical rail 115b. The first vertical rail 115a and/or the second vertical rail 115b include corresponding motors (not shown) that enable bracket 116, when attached, to be translated in a vertical direction.

A first arm 117a is coupled to bracket 116 at a first pivot bracket 118a. A second arm 117b is coupled to the bracket 116 at a second pivot bracket 118b. The first arm 117a and the second arm 117b include one or more corresponding modules. Although FIG. 1A depicts the first arm 117a and the second arm 117b each having 4 modules, an arm may include 1:n modules. In some embodiments, the number of modules on the first arm 117a and the second arm 117b is the same. In some embodiments, the number of modules on the first arm 117a and the second arm 117b is different. As seen in FIG. 1D, the first arm 117a includes modules 161a, 161b, 161c and the second arm 117b includes modules 161d, 161e, 161f. Modules 161a, 161b, 161c, 161d, 161e, 161f may be a light module, a camera module, a sprayer module, or other type of module used for farming. In some embodiments, the modules 161a, 161b, 161c, 161d, 161e, 161f are the same type of modules. In some embodiments, at least one of the modules 161a, 161b, 161c, 161d, 161e, 161f is different than the other modules 161a, 161b, 161c, 161d, 161e, 161f.

The distance between the modules can be configurable based on the size of the plants in a row. For example, a module may be positioned such that it is equidistant to plants located on a first side of a row and plants located on a second side of a row. The distance between the modules can be configurable based on a distance the between rows in a grow environment. The number of modules on an arm is adjustable based on a number of rows in a farm. The location of modules on an arm are configured in a manner to eliminate or reduce the likelihood that a module will come into contact with an object as the robotic system is traveling through the grow environment. The plurality of modules may be daisy chained together.

The first arm 117a and the second arm 117b may be adjustable to one or more positions that are in between the first position shown in FIG. 1A (closed) and the second position shown in FIG. 1B (open). In some embodiments, the first arm 117a and the second arm 117b are associated with corresponding angle adjusters 151a, 151b, respectively. The angle adjusters 151a, 151b enable the agricultural robot to handle uneven terrains. In some embodiments, the angle between the arms 117a, 117b and the ground is manually adjusted by angle adjusters 151a, 151b. In some embodiments, the angle between the arms 117a, 117b and the ground is electronically adjusted by angle 151a, 151b via a control signal (e.g., a control signal provided to a controller located in electronics container 119). In some embodiments, angle adjusters 151a, 151b include position sensors and position actuators and control the corresponding position of arms 117a, 117b based on the detected positions. In some embodiments, the arms 117a, 117b or the angle adjusters 151a, 151b themselves include corresponding tilt sensors and angle adjusters 151a, 151b are configured to automatically adjust the angle of arms 117a, 117b to a particular angle (e.g., such that they are parallel to the ground) based on an output of the corresponding tilt sensors. In some embodiments, the arms 117a, 117b or the angle adjusters 151a, 151b themselves include corresponding inertial measurement units (IMUs) and angle adjusters 151a, 151b are configured to automatically adjust the angle of arms 117a, 117b to a particular angle based on an output of the corresponding IMUs. A sensor output (e.g., output of position sensor, output of tilt sensor, output of IMU) may indicate that an arm is unlevel or the robotic system is unlevel.

The modular treatment device includes an electronics container 119 that includes a plurality of electronics components and wiring for the modular treatment device. In some embodiments, the plurality of electronics components includes one or more batteries that power the modular treatment device. In some embodiments, the wiring includes a power cable that powers the modular treatment device using power from the robotic system or other power system.

Figure 2:
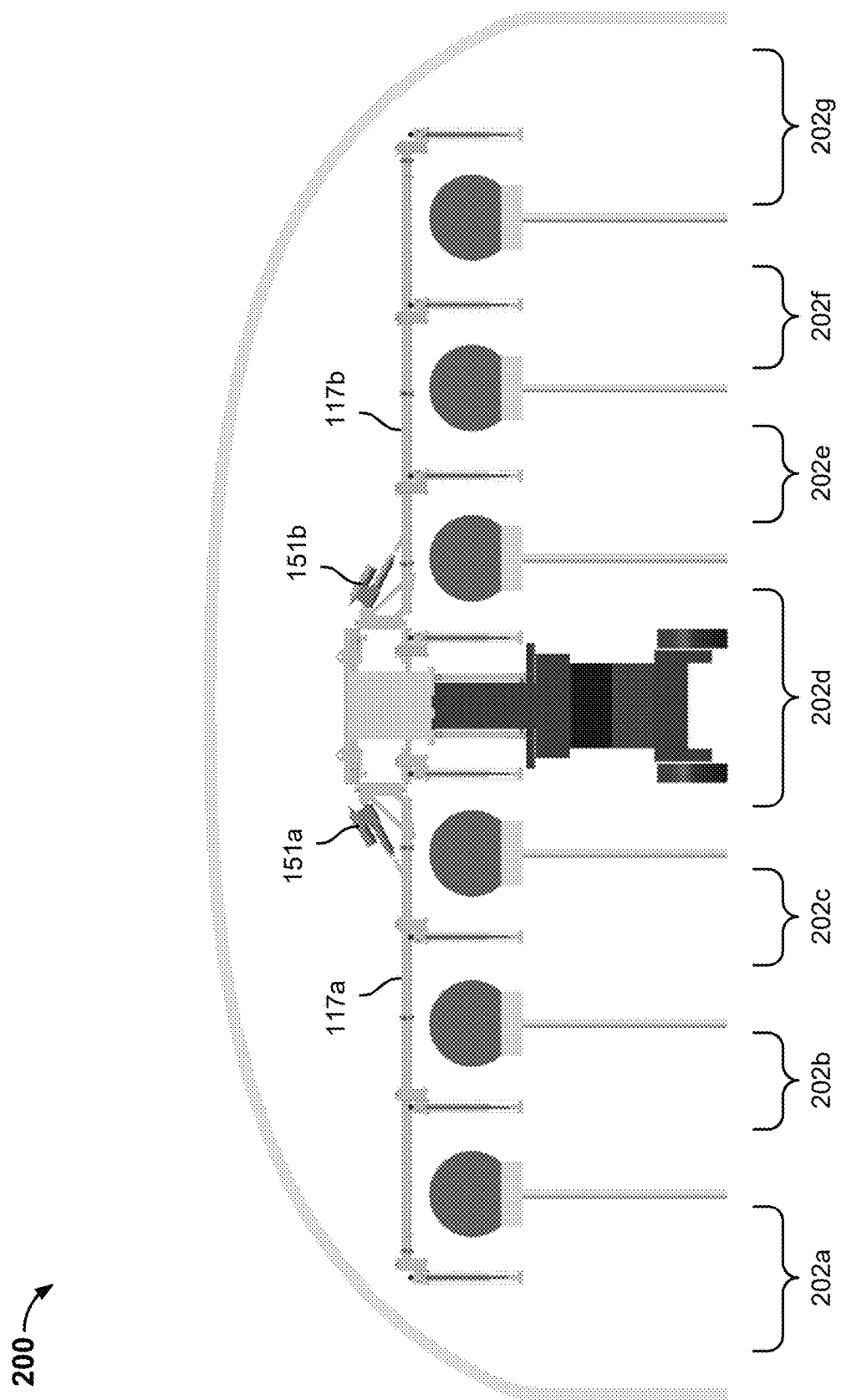
FIG. 2 is a front view of a system to treat plants for disease in accordance with some embodiments.
Figure 3:
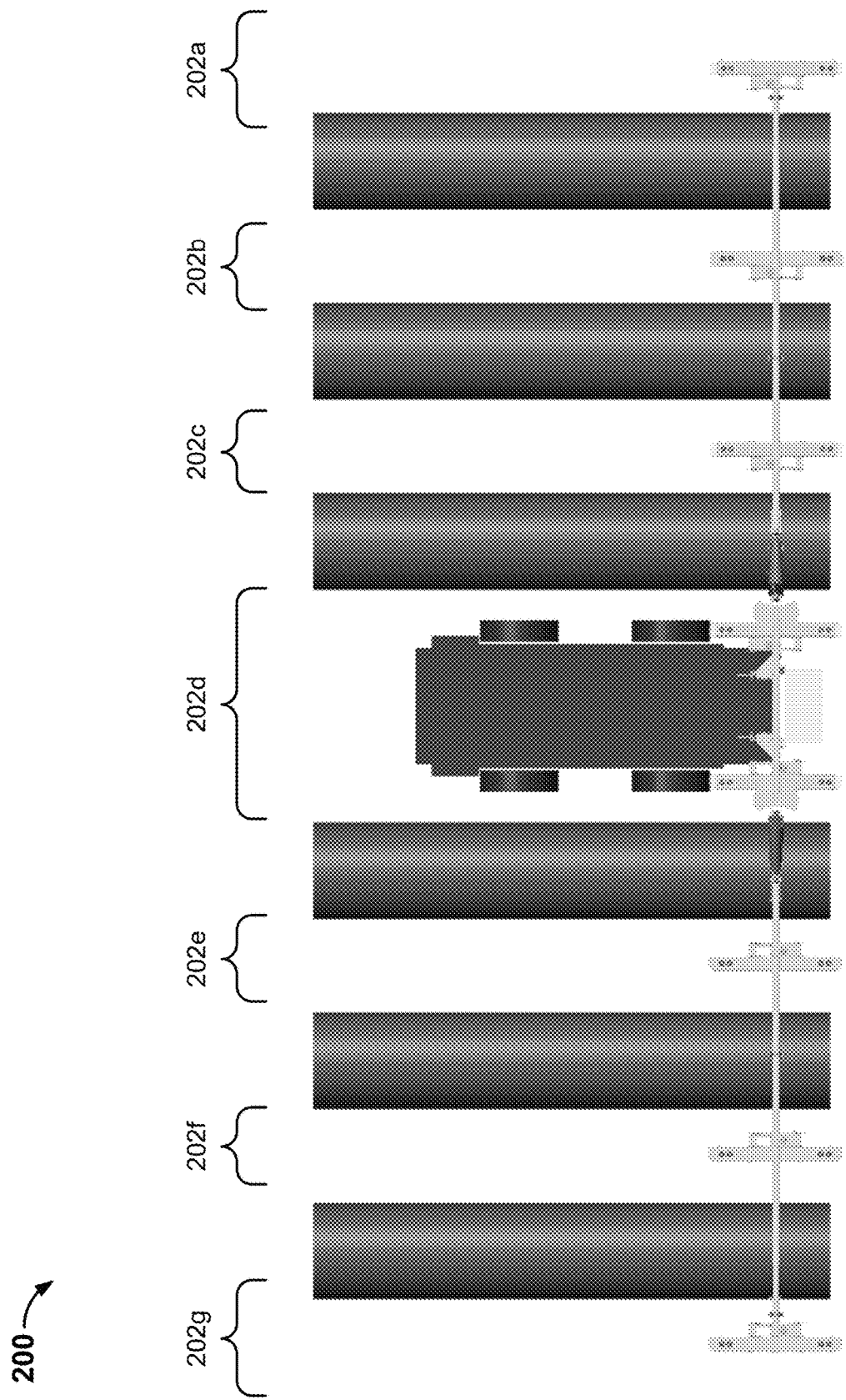
FIG. 3 is a top-down view of a system to treat plants for disease in accordance with some embodiments.
Figure 4:
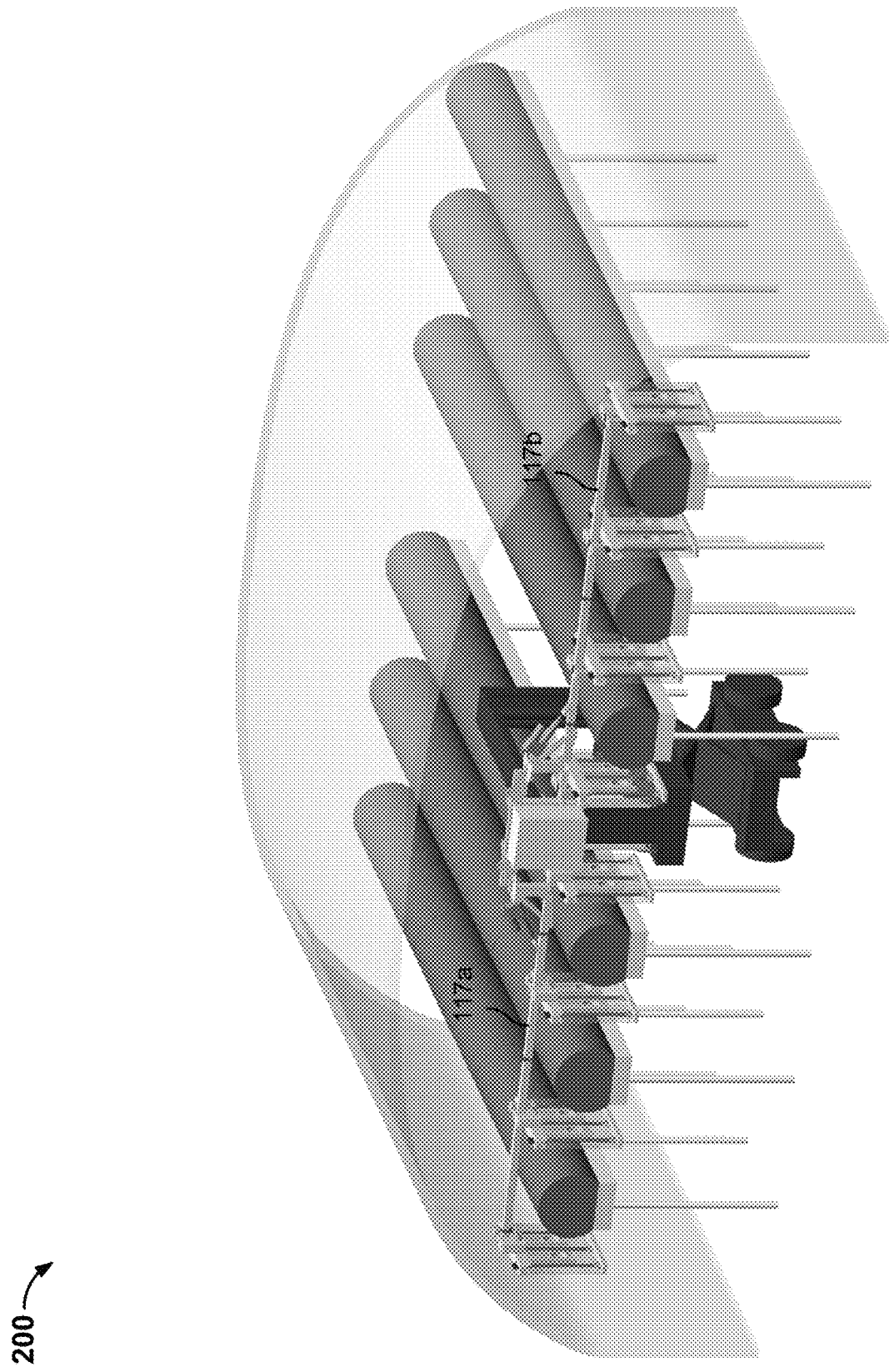
FIG. 4 is a perspective view of a system to treat plants for disease in accordance with some embodiments.

FIG. 2 is a front view of a system to treat plants for disease in accordance with some embodiments. FIG. 3 is a top-down view of a system to treat plants for disease in accordance with some embodiments. FIG. 4 is a perspective view of a system to treat plants for disease in accordance with some embodiments. In the examples shown, the system is traveling in a grow environment 200 that includes rows 202a, 202b, 202c, 202c, 202d, 202e, 202f, 202g. The width of a row in a grow environment, for example row 202d, may be different than a width of other rows in the grow environment. This enables an agricultural robot having a modular treatment device, such as modular treatment device 112, to travel through at least one of the rows in a grow environment.

In the example shown, the first arm 117a and the second arm 117b have been adjusted from the first position to the second position. This enables the modular treatment device to concurrently treat plants in rows 202a, 202b, 202c, 202d, 202e, 202f, 202g for disease. The first arm 117a and the second arm 117b may be vertically translated up or down based on a height of the plants. In some embodiments, the first arm 117a and the second arm 117b are equipped with a plurality of sprayer modules to spray pesticides and/or fertilizer. In some embodiments, the first arm 117a and the second arm 117b are equipped with one or more camera modules to monitor a treatment of a grow environment and to collect data associated with the treatment of the grow environment. The collected data may be used to implement computer vision, enabling a processor to identify particular locations of plants that have disease or are about to become sick.

Figure 5A:
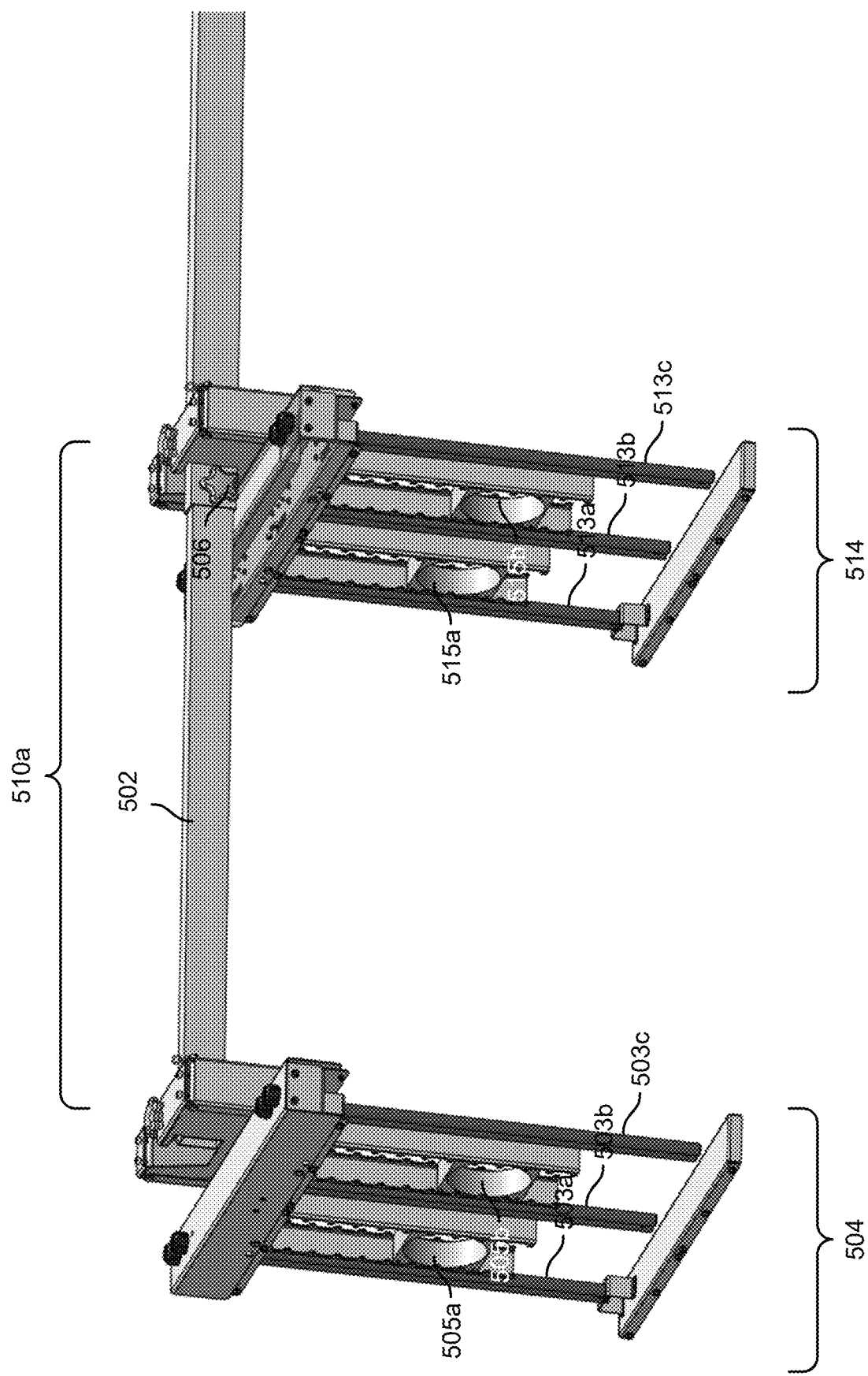
Figure 5C:
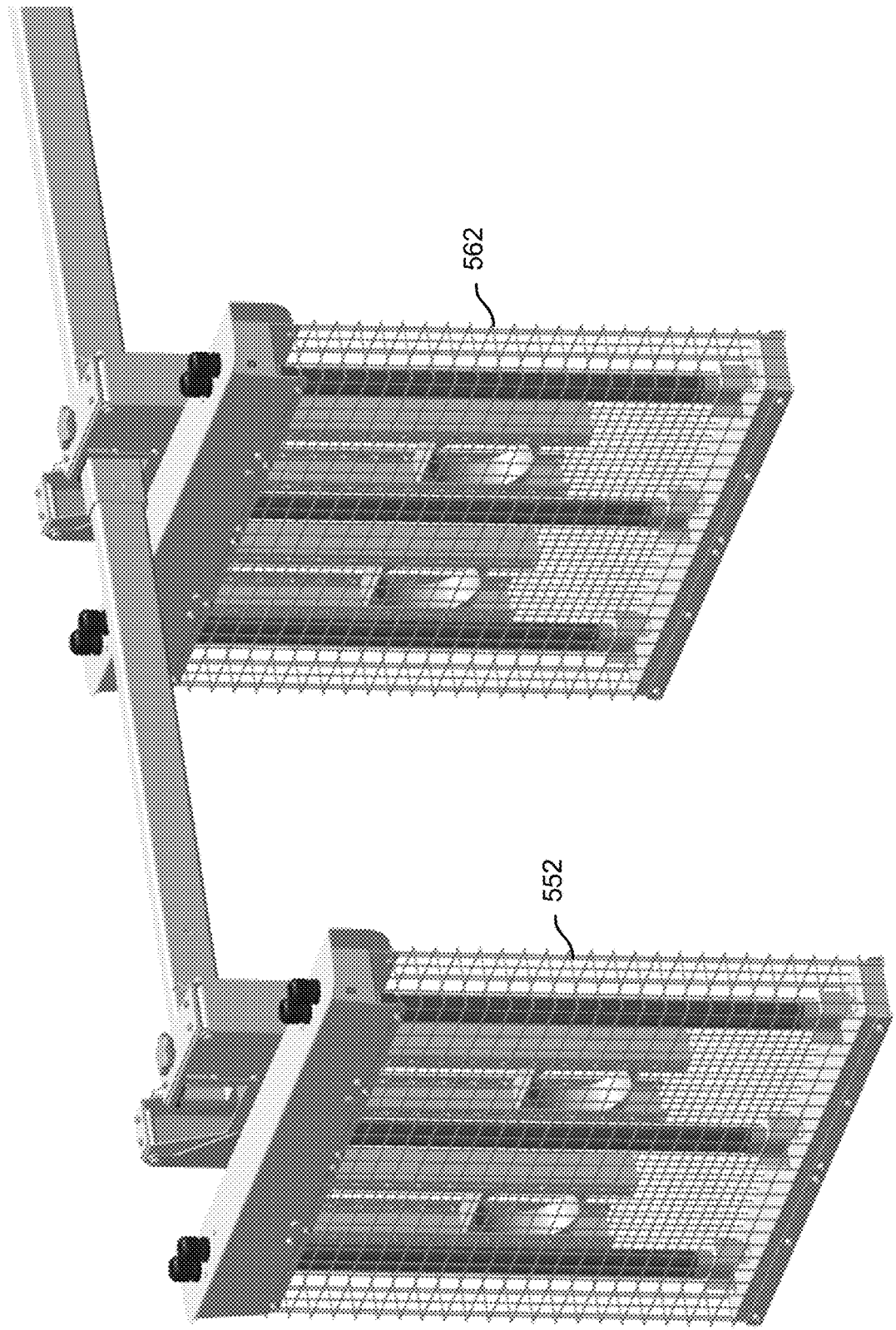

FIG. 5A is a diagram illustrating an arm having two modules in accordance with some embodiments. In the example shown, arm 502 includes a first module 504 and a second module 514. In this example, the first module 504 and the second module 514 are light modules. The first module 504 and the second module 514 are separated by a configurable distance 510a. The distance between the first module 504 and the second module 514 may be adjusted by loosening knob 506, adjusting the distance, and then tightening knob 506 to establish the distance. In some embodiments, the distance between the first module 504 and the second module 514 is increased. In some embodiments, the distance between the first module 504 and the second module 514 is decreased. The distance may change using an actuator. In some embodiments, the distance automatically adjusts based on sensor inputs such that the modules are a specified distance from the plants to be treated and/or obstacles. As seen in FIGS. 5A and 5B, the distance has been modified from configurable distance 510a to configurable distance 510b. In some embodiments, the distance is modified while the robotic system is moving to prevent a collision from fully interfering with a module and stopping operation of the robotic system. In some embodiments, as seen in FIG. 5C, the modules 504, 514 are protected by enclosures 552, 562, respectively.

The first module 504 and the second module 514 each may have a corresponding set of lights. In the example shown, the first module 504 includes a first set of lights that includes lights 503a, 503b, 503c and the second module 504 includes a second set of lights that includes lights 513a, 513b, 513c. Although FIG. 5A depicts the first module 504 and the second module 514 each having three lights, a module may include 1:n lights.

The first module 504 and the second module 514 each may have a corresponding set of fans. In the example shown, the first module 504 includes a first set of fans that includes fans 505a, 505b and the second module 514 includes a second set of fans that includes fans 515a, 515b. Although FIG. 5A depicts the first module 504 and the second module 514 each having two fans, a module may include 0:n fans. In some embodiments, a module includes n−1 fans where n is the number of lights in a module. The fans may be located in between two lights of a module. The purpose of the fan is to move leaves or other material out of the way so that an underside of a plant may be irradiated with light from the module.

Figure 6A:
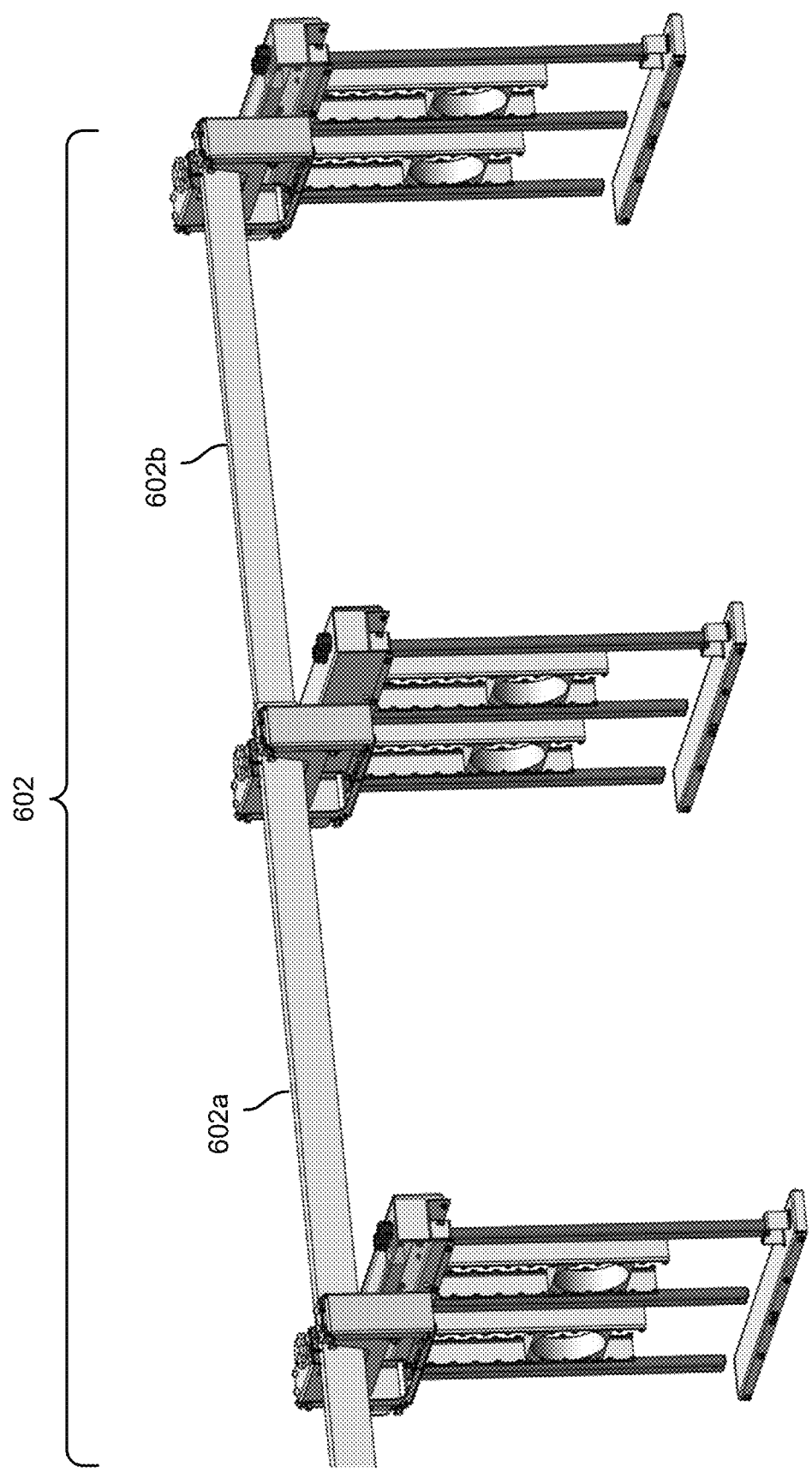
FIGS. 6A and 6B are diagrams illustrating an extendable arm in accordance with some embodiments.
Figure 6B:
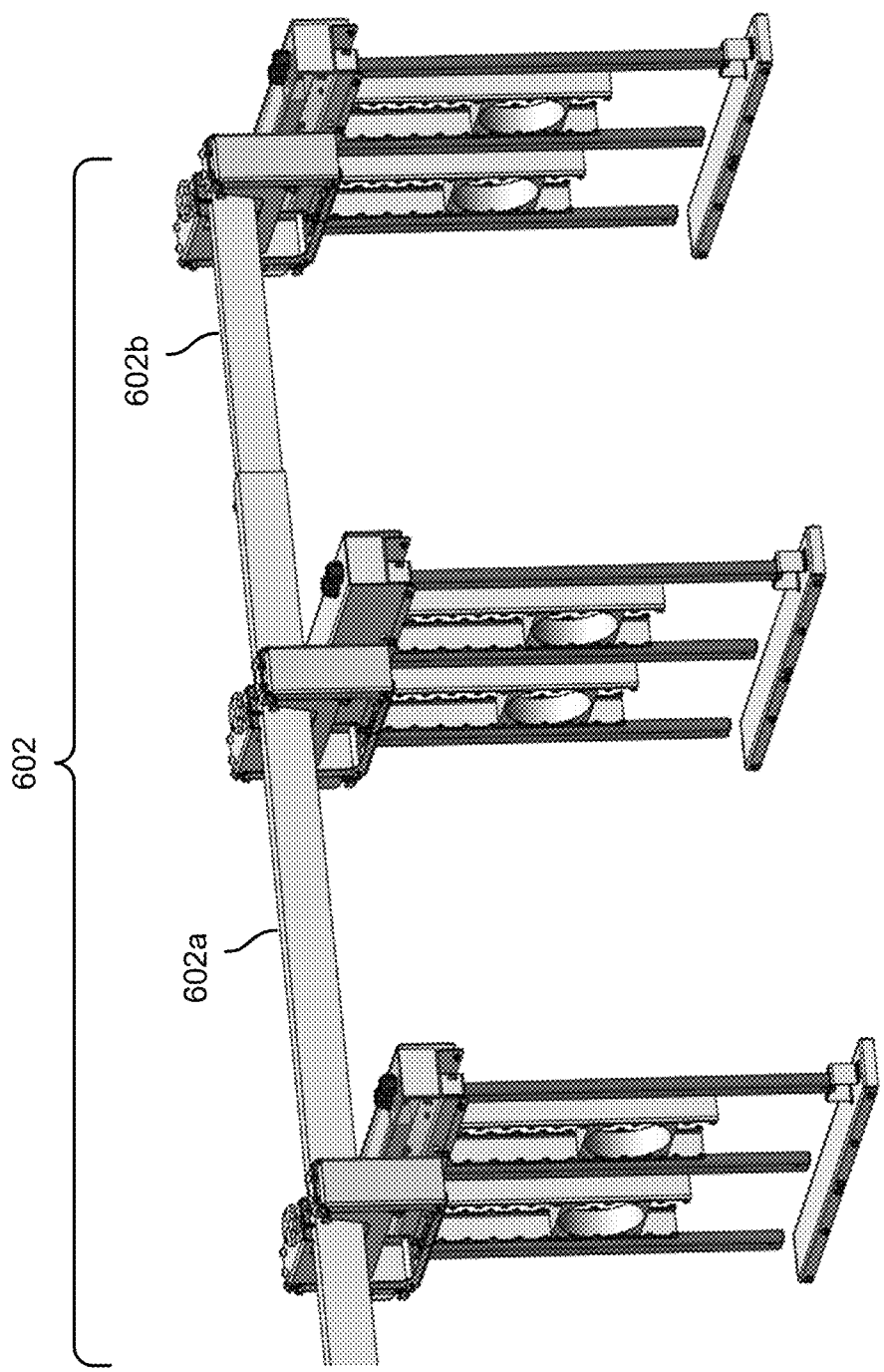

FIGS. 6A and 6B are diagrams illustrating an extendable arm in accordance with some embodiments. In the example shown, arm 602 is comprised of a first part 602a and a second part 602b. Arm 602 may be a telescopic arm such that the second part 602b fits inside of the first part 602a and the second part 602b may be extended in a telescopic manner to increase the length of arm 602. In some embodiments, the first part 602a and the second part 602b are connected to each other via an external track.

Figure 7:
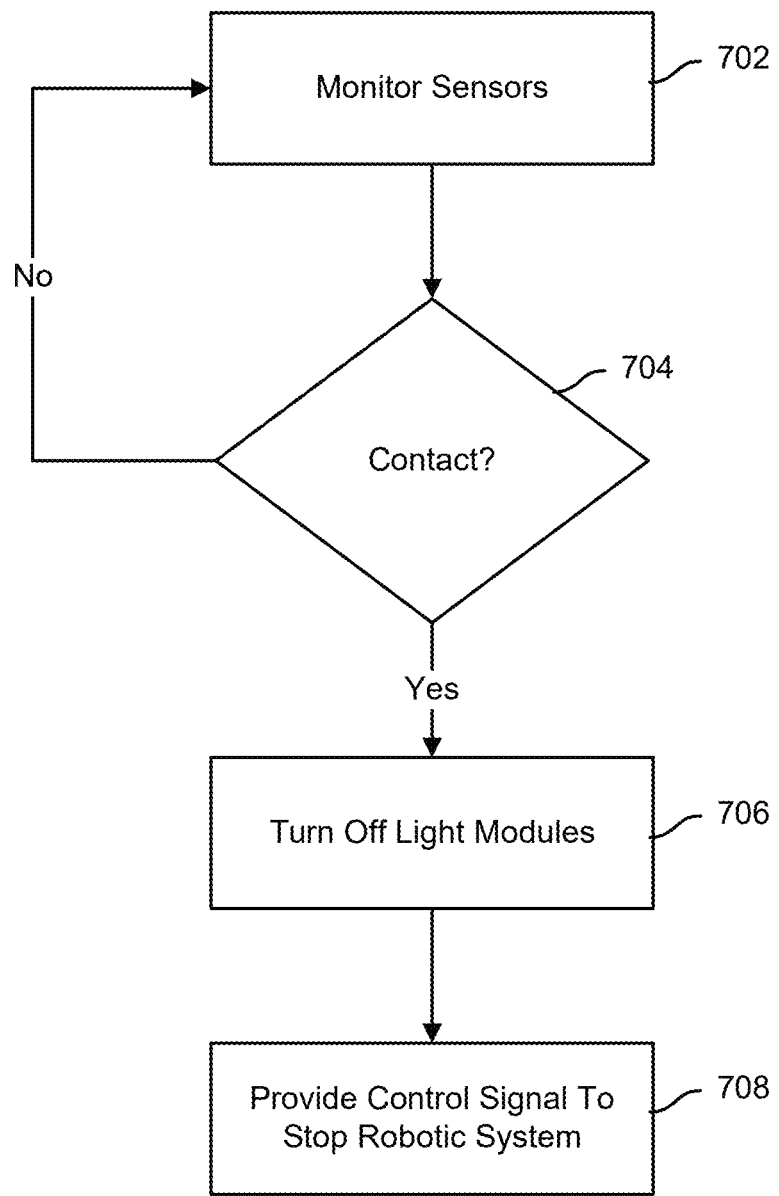
FIG. 7 is a flow diagram illustrating a process to treat plants during a treatment cycle in accordance with some embodiments.

FIG. 7 is a flow diagram illustrating a process to treat plants during a treatment cycle in accordance with some embodiments. In the example shown, process 700 may be implemented by a processor, such as processor 801. In some embodiments, process 700 is implemented using a discrete logic circuit that includes one or more switches.

At 702, a plurality of sensors is monitored. A module device includes a plurality of light modules. The light module may be a UVC light module or other type of light module. The light module includes one or more lights. A light module is located on an arm associated with a modular treatment device. In some embodiments, a single sensor is associated with an entire arm. In some embodiments, a plurality of sensors is associated with an arm. The plurality of sensors may be located at various positions on the arm. In some embodiments, each light module on an arm is associated with a corresponding sensor. The plurality of sensors is monitored to determine whether any of the light modules has come into contact with one or more objects (e.g., plants).

A sensor may be a hall effect sensor, a force sensor, an imaging sensor, a light sensor, a proximity sensor, a capacitive sensor, or any other type of sensor that outputs a value indicative of contact between two objects, such as a plant and the modular treatment device. A sensor may output a first value when the arm does not come into contact with an object. A sensor may output a second value when the arm comes into contact with an object. The amplitude of the second value may depend on a distance between a location of the sensor and a location of the arm at which the object contacted the arm. For example, the amplitude of the second value may be greater when the sensor is located at the location of the arm at which the object contacted the arm than when the sensor is located offset from the location of the arm at which the object contacted the arm.

At 704, it is determined whether at least one of the light modules has come into contact with an object. At least one of the light modules is determined to have come into contact with an object based on an output of at least one of the sensors. In some embodiments, at least one of the light modules is determined to have come into contact with an object if a sensor output associated with one of the sensors is greater than a threshold. In some embodiments, the corresponding outputs of the plurality of sensors are provided as input to a machine learning model trained to output a value indicating a likelihood that at least one of the UVC light modules has come into contact with an object.

In response to a determination that at least one of the UVC light modules has come into contact with an object, process 700 proceeds to step 706. In some embodiments, the output of at least one of the plurality of sensors is greater than a threshold. In some embodiments, the machine learning model outputs a confidence value greater than a threshold. The confidence value indicates that the machine learning model has predicted that at least one of the UVC light modules has come into contact with an object.

In response to a determination that at least one of the UVC light modules has not come into contact with an object, process 700 proceeds to returns to step 702.

At 706, the plurality of light modules is turned off. This limits or may prevent damage to plants near the light modules. In some embodiments, the intensity of light outputted by the plurality of light modules is reduced. A plant may become damage if exposed to excessive amounts of UVC light for an extended period of time.

At 708, a control signal is provided to stop a robotic system on which the modular treatment device is situated. In some embodiments, the processor has a communication channel (wired or wireless) with a motor controller associated with the robotic system. The processor may provide the control signal to the motor controller associated with the robotic system. In response to receiving the control signal, the motor controller associated with the robotic system is configured to stop a motor associated with the robotic system and/or cause a stopping force (e.g., a brake) to be applied to one or more wheels associated with the robotic system. After the agricultural robot has come to a stop, an operator may inspect the agricultural robot and adjust a position of the contacting object so that the contacting object is no longer in contact with any of the light modules, the arm(s), modular treatment device, and/or the robotic system.

In some embodiments, the control signal causes the robotic system to automatically attempt to make a correction to eliminate the collision (e.g., back up, move to the left or right, continue moving forward).

In some embodiments, step 708 is performed before step 706. In some embodiments, step 706 is performed in parallel with step 708. In some embodiments, a part of step 706 is performed in parallel with a part of step 708.

Figure 8:
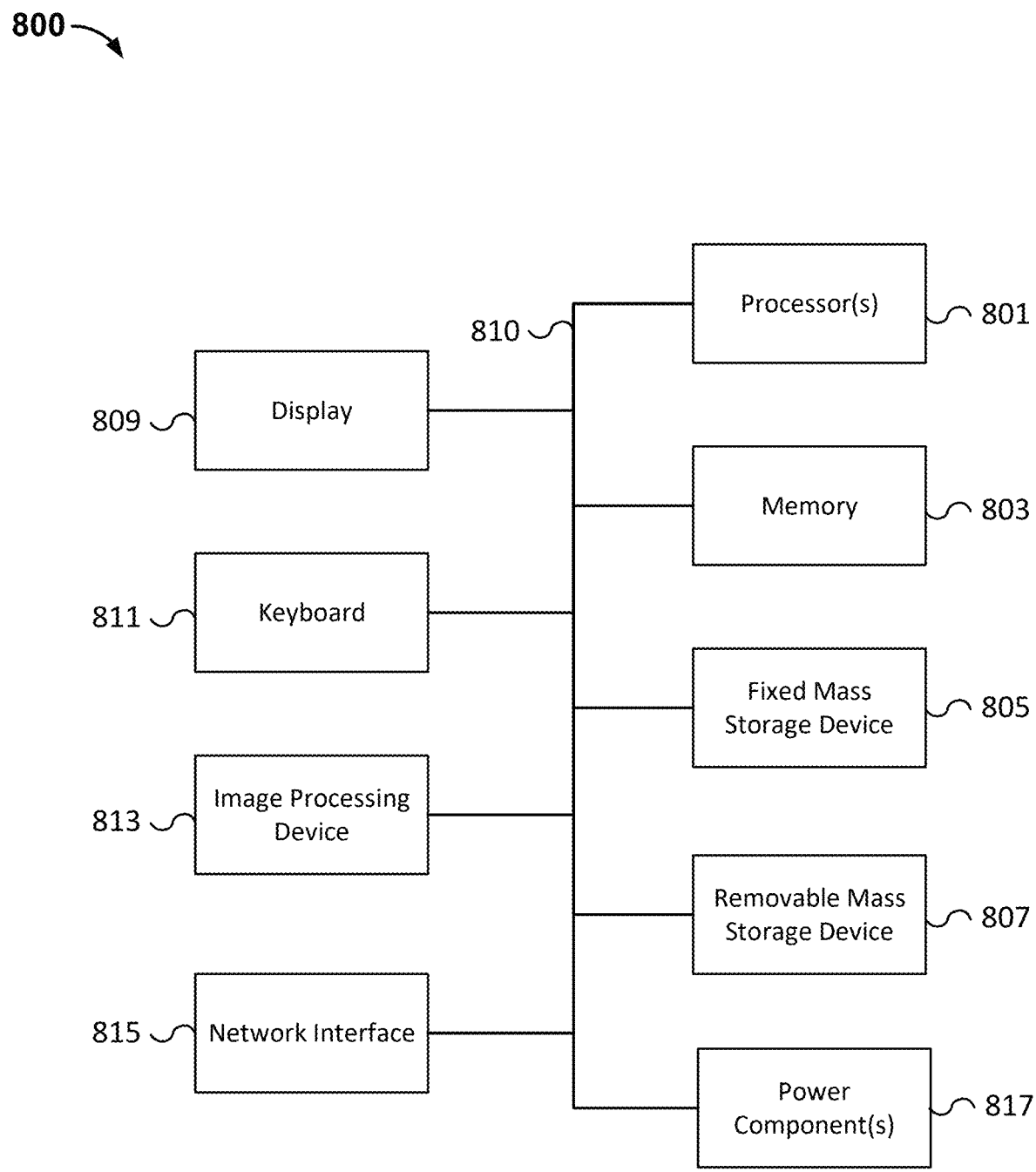
FIG. 8 is a functional diagram illustrating a programmed computer system to treat plants for disease in accordance with some embodiments.

FIG. 8 is a functional diagram illustrating a programmed computer system to treat plants for disease in accordance with some embodiments. Some or all components of the programmed computer system may be housed in electronics container 119. As will be apparent, other computer system architectures and configurations can be used to perform the described product generation technique. Computer system 800, which includes various subsystems as described below, includes at least one microprocessor subsystem (also referred to as a processor or a central processing unit (CPU) 801). Processor 801 can be implemented by a single-chip processor or by multiple processors. In some embodiments, processor 801 is a general purpose digital processor that controls the operation of the computer system 800. In some embodiments, processor 801 also includes one or more coprocessors or special purpose processors (e.g., a graphics processor, a network processor, etc.). Using instructions retrieved from memory 803, processor 801 controls the reception and manipulation of input data received on an input device (e.g., keyboard 811, image processing device 813, etc.), and the output and display of data on output devices (e.g., display 809).

Processor 801 is coupled bi-directionally with memory 803, which can include, for example, one or more random access memories (RAM) and/or one or more read-only memories (ROM). As is well known in the art, memory 803 can be used as a general storage area, a temporary (e.g., scratch pad) memory, and/or a cache memory. Memory 803 can also be used to store input data and processed data, as well as to store programming instructions and data, in the form of data objects and text objects, in addition to other data and instructions for processes operating on processor 801. Also as is well known in the art, memory 803 typically includes basic operating instructions, program code, data, and objects used by the processor 801 to perform its functions (e.g., programmed instructions). For example, memory 803 can include any suitable computer readable storage media described below, depending on whether, for example, data access needs to be bi-directional or uni-directional. For example, processor 801 can also directly and very rapidly retrieve and store frequently needed data in a cache memory included in memory 803.

A removable mass storage device 807 provides additional data storage capacity for the computer system 800, and is optionally coupled either bi-directionally (read/write) or uni-directionally (read only) to processor 201. A fixed mass storage 805 can also, for example, provide additional data storage capacity. For example, storage devices 805 and/or 807 can include computer readable media such as magnetic tape, flash memory, PC-CARDS, portable mass storage devices such as hard drives (e.g., magnetic, optical, or solid state drives), holographic storage devices, and other storage devices. Mass storages 805 and/or 807 generally store additional programming instructions, data, and the like that typically are not in active use by the processor 801. It will be appreciated that the information retained within mass storages 805 and 807 can be incorporated, if needed, in standard fashion as part of memory 803 (e.g., RAM) as virtual memory.

In addition to providing processor 801 access to storage subsystems, bus 810 can be used to provide access to other subsystems and devices as well. As shown, these can include a display 809, a network interface 815, an input/output (I/O) device interface 811, an image processing device 813, power components 817 (e.g., batteries), as well as other subsystems and devices. For example, image processing device 813 can include a camera, a scanner, etc.; I/O device interface 811 can include a device interface for interacting with a touch-screen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 800. Multiple I/O device interfaces can be used in conjunction with computer system 800. The I/O device interface can include general and customized interfaces that allow the processor 801 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 815 allows processor 801 to be coupled to another computer, computer network, or telecommunications network using a network connection as shown. For example, through the network interface 815, the processor 801 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 801 can be used to connect the computer system 800 to an external network and transfer data according to standard protocols. For example, various process embodiments disclosed herein can be executed on processor 801, or can be performed across a network such as the Internet, intranet networks, or local area networks, in conjunction with a remote processor that shares a portion of the processing. Additional mass storage devices (not shown) can also be connected to processor 801 through network interface 815. Processor 801 may communicate with a motor controller via network interface 815. Processor 801 may receive sensor data from a plurality of sensors via network interface 815.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 811 and display 809 share the touch sensitive screen component, which both detects user inputs and displays outputs to the user). In addition, bus 810 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An agricultural robot, comprising:
   a modular treatment device coupled to a robotic system, the modular treatment device including a boom system having a first arm and a second arm, wherein the first arm and the second arm are configured to be rotated from being parallel with a length side of a base of the agricultural robot to perpendicular with the length side of the base of the agricultural robot; and
   a plurality of modules located on the first arm and the second arm, wherein at least one of the plurality of modules is a light module.

2. The agricultural robot of claim 1, wherein the robotic system includes a gantry structure.

3. The agricultural robot of claim 2, wherein a first vertical rail of the modular treatment device is located on a first side of the gantry structure and a second vertical rail of the modular treatment device is located on a second side of the gantry structure.

4. The agricultural robot of claim 3, wherein a bracket is attached to the first vertical rail and the second vertical rail.

5. The agricultural robot of claim 4, wherein the boom is attached to the bracket.

6. The agricultural robot of claim 1, wherein the first arm and the second arm are adjustable from at least a first position to a second position.

7. The agricultural robot of claim 6, wherein in the first position, the first arm and the second arm are parallel with the base of the agricultural robot.

8. The agricultural robot of claim 6, wherein in the second position, the first arm and the second arm are perpendicular to the base of the agricultural robot.

9. The agricultural robot of claim 1, wherein the modular treatment device is coupled to the robotic system via another piece of equipment.

10. The agricultural robot of claim 1, wherein modular treatment device is mounted to the another piece of equipment.

11. The agricultural robot of claim 1, wherein the light module outputs ultraviolet-C light.

12. The agricultural robot of claim 1, wherein a number of the plurality of modules on the first arm or the second arm is adjustable based on a number of rows in a grow environment.

13. The agricultural robot of claim 1, wherein a distance between the plurality of modules is adjustable based on a size of plants in a row.

14. The agricultural robot of claim 1, wherein a distance between the plurality of modules is adjustable based on a distance between rows in a grow environment.

15. The agricultural robot of claim 1, wherein the at least one of the plurality of modules includes one or more fans.

16. The agricultural robot of claim 1, wherein the first arm or the second arm is an adjustable arm that includes a first part and a second part.

17. The agricultural robot of claim 1, further comprising a plurality of sensors, wherein a first subset of the plurality of sensors is located on the first arm and a second subset of the plurality of sensors is located on the second arm.

18. The agricultural robot of claim 17, wherein each of the plurality of sensors align with a location of the plurality of modules on the first arm and the second arm.

19. The agricultural robot of claim 17, wherein at least one of the plurality of sensors is offset from the plurality of modules on the first arm and the second arm.

20. The agricultural robot of claim 17, further comprising a processor configured to receive a corresponding output from the plurality of sensors.

21. The agricultural robot of claim 20, wherein the processor is configured to determine the agricultural robot has made contact with an object based on the corresponding output of at least one of the plurality of sensors.

22. The agricultural robot of claim 21, wherein the processor is configured to cause the light module to be turned off in response to the corresponding output of the least one of the plurality of sensors.

23. The agricultural robot of claim 21, wherein the processor is configured to cause the agricultural robot to stop in response to the corresponding output of the at least one of the plurality of sensors.

24. The agricultural robot of claim 19, wherein the corresponding output from the plurality of sensors is provided as an input feature vector to a machine learning model trained to output a value indicating a likelihood that at least one of the modules has come into contact with an object.

25. The agricultural robot of claim 1, wherein the plurality of modules is connected via a daisy chain.

26. The agricultural robot of claim 1, wherein the plurality of modules is surrounded by an enclosure.

27. The agricultural robot of claim 1, wherein the first arm is associated with a first angle adjuster and the second arm is associated with a second angle adjuster.

28. The agricultural robot of claim 1, wherein the modular treatment device is situated on top of the base via a lifting mechanism.

* * * * *